Sept. 7, 1954  G. H. ROUSSEL  2,688,150
VARIABLE VOLUME CHAMBER
Filed Aug. 6, 1947  2 Sheets-Sheet 1
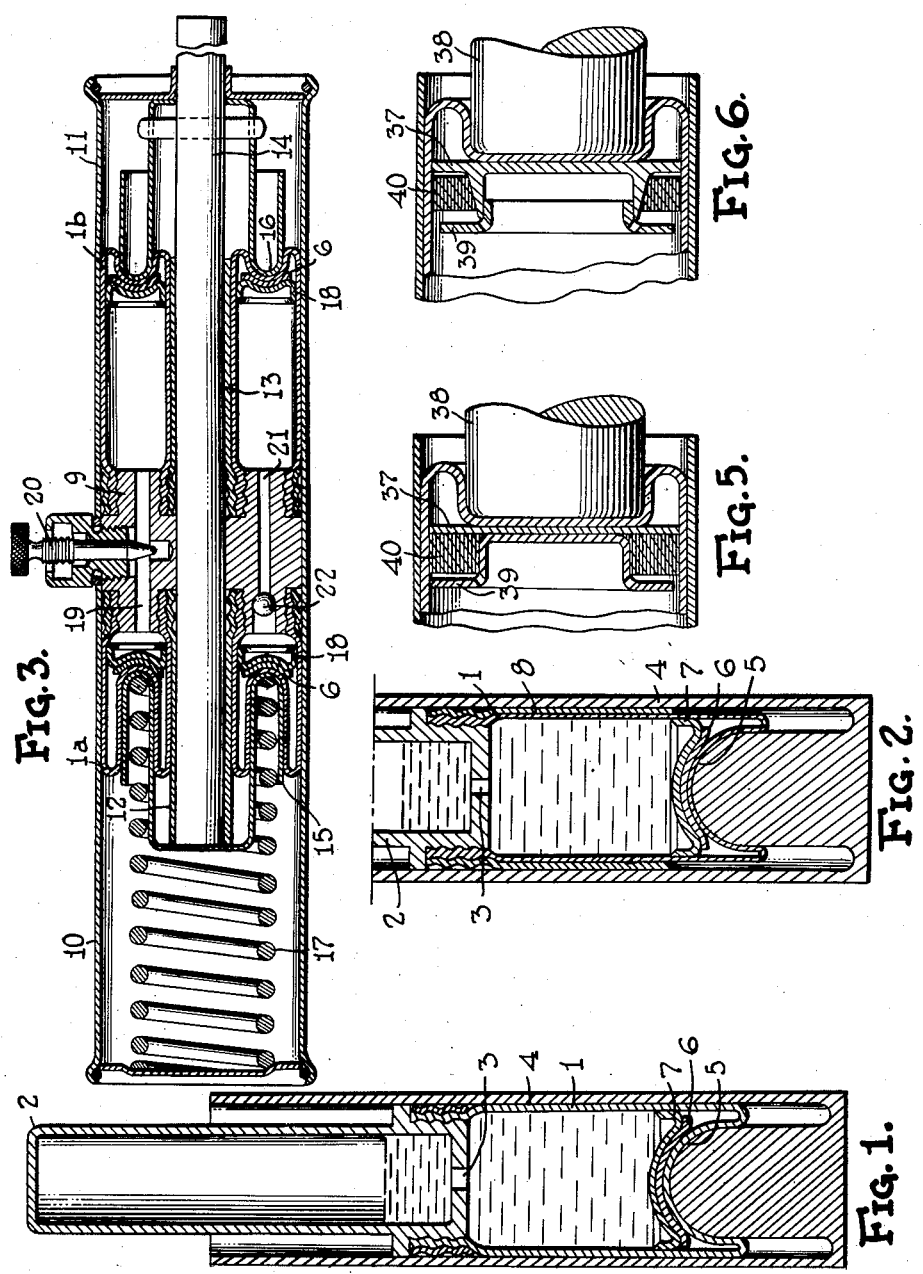
INVENTOR
GEORGES H. ROUSSEL
BY
ATTORNEY Sept. 7, 1954    G. H. ROUSSEL    2,688,150
VARIABLE VOLUME CHAMBER
Filed Aug. 6, 1947    2 Sheets-Sheet 2
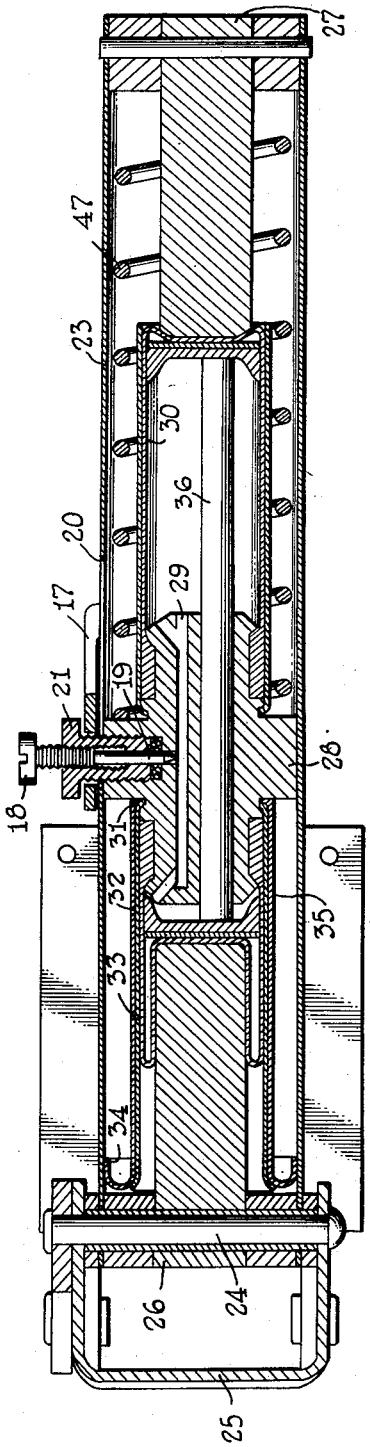
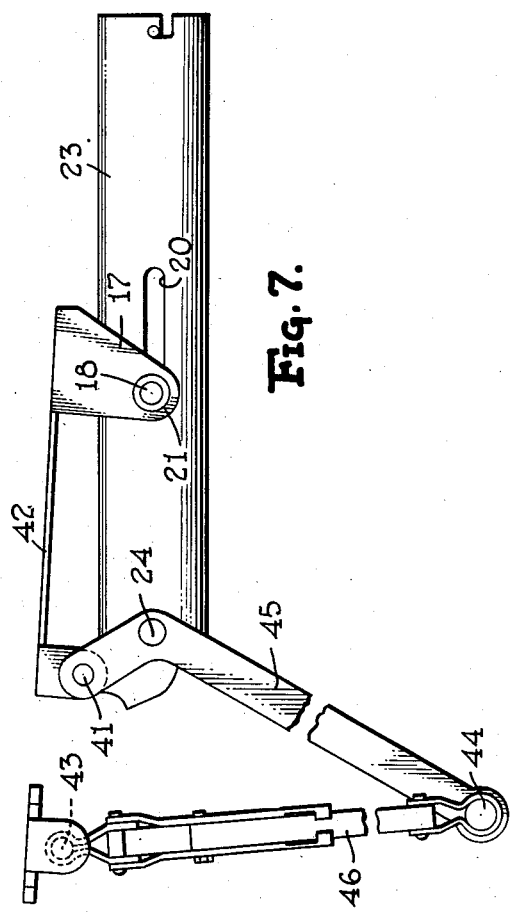
INVENTOR
GEORGES H. ROUSSEL
BY
ATTORNEY Patented Sept. 7, 1954

2,688,150

UNITED STATES PATENT OFFICE 2,688,150

VARIABLE VOLUME CHAMBER

Georges Henri Roussel, Courbevoie, France

Application August 6, 1947, Serial No. 766,565
In France May 27, 1946

Section 1, Public Law 690, August 8, 1946
Patent expires May 27, 1966

4 Claims. (Cl. 16—52)

My invention has for its object damping systems and more generally any variable volume systems such as pumps, atomizers and the like including, inside a rigid casing, a yielding sealed chamber or bladder containing a fluid and adapted to be submitted to variations in pressure and in volume through deformation. In such devices, a piston is adapted to act on a portion of the wall of the bladder, the diameter of the piston being selected in a manner such that it may move with sufficient play for allowing the penetration of the deformed parts inside the yielding bladder.

An important object of the invention consists of means permitting the protection of the deformed portion of the bladder, whereby the pressure during operation is withstood by a rigid metallic member, rather than by the fragile bladder, the purpose of this arrangement being to prevent the introduction of oil in the fold formed by the bladder during the penetration of the piston in said bladder and, after the pressure has been removed, to enable the return in the bladder of fluid leaks trapped in the fold.

Another object contemplates means for permitting the free sliding movement of elastic packing means on the inside surface of the bladder. This is obtained by choosing the materials in contact so that the friction co-efficient of the outside surface of the bladder, when dry, upon the inside surface of the rigid metallic chamber, or cylinder, be superior to the friction co-efficient of the elastic means upon the inside surface of the bladder. Thereby is prevented the formation of folds or creases that may cause tears of the bladder during the sliding motion of contacting surfaces.

As an example, and for purposes of illustration only, an embodiment of the invention is shown in the annexed drawings, wherein:

Fig. 1 is a longitudinal section through a pressure chamber showing the basic principles of the invention;

Fig. 2 is a modification of the lower part of Fig. 1.

Fig. 3 is a longitudinal section of a door closing appliance associated with a hydraulic damper according to the invention.

Fig. 4 is a longitudinal section through a door-closing mechanism according to the invention.

Fig. 5 is an enlarged detail section showing the elastic packing means, Fig. 6 is a similar view showing a modification of said means.

Fig. 7 is a schematic view of a door closing device according to the invention and having articulated arms.

Referring to the drawings, wherein the same reference characters represent corresponding parts throughout, the rigid member of Fig. 1 is formed of a tube or cylinder 4 one extremity or end of which is closed and the other end closed by the bottom of a chamber 2 in which the fluid used in the device can penetrate through one or more apertures 3. This chamber 2 is closed by a cover at each end, the cover opposed to that provided with the aperture 3 being solid. Inside the cylinder there is disposed a flexible enclosure or bladder 1 formed of rubber, for example, which is closed towards the open end of the cylinder and having its open end directed towards the closed end of said cylinder. The open end of the bladder is clamped between co-operating corrugations on the projecting bottom of the chamber 2 and on the inside of the cylinder 4. The bottom of the bladder 1 rests on the rounded extremity of a plunger 5 projecting from the center of the outside cylinder bottom. The diameter of the plunger or piston is slightly inferior to the inside diameter of the tube in order to leave a space sufficient for the formation of the bladder fold, as is to be explained later on.

The inside surface of the deformed part of the bladder is capped by a rigid washer 6 upon which a diaphragm 7 is disposed, the edge of this diaphragm being in contact with the wall of the bladder. The said bladder is adapted to hold a fluid or liquid, for example oil, which penetrates more or less into the apertures 3 inside the chamber 2 and, by doing so, compressing the air contained in said chamber according to the pressure exerted upon the bladder by the piston 5. The flexible diaphragm being in contact with the rigid washer transmits thereto the fluid pressure and, accordingly, protects the bladder fold against the pressure stresses, while the diaphragm 7 prevents the passage of fluid inside the so formed folds. Whenever the piston 5 is withdrawn, the diaphragm is adapted to be deformed away from the bladder, that is: the edges of said diaphragm are withdrawn from the inside surface of the bladder thereby allowing the possible liquid leaks inside the fold to flow back inside the bladder.

In the modification illustrated in Fig. 2, there is inserted a stationary sleeve 8 inside the cylinder 4 between the latter and the bladder in order to protect the said bladder against the frictional contact of the sliding cylinder 4.

In order that the device of the invention may operate properly, as basically described above, it is important that the inside surface of the bladder be lubricated: consequently, the fluid used must either have lubricating properties or a lubricant introduced therein. Since the outer surface of the bladder remains dry and the different surfaces considered operate frictionally during operation, it is imperative that the various friction co-efficients be properly chosen so that the sliding of the diaphragm inside the bladder be possible without causing creases in said bladder. This is perfectly possible if the friction co-efficient of the bladder, dry, upon the inside surface of the tube (0.6) is above the friction co-efficient of the diaphragm upon the wet inside surface of the bladder (0.15).

In Fig. 3 which is an axial cross-section of a door closing system with a hydraulic damper, two rubber bags or bladders 1a and 1b of annular cross-section are secured to either side of a sleeve 9 and are housed inside cylindrical casings 10 and 11 which are rigid with said sleeve. The axial passage-way round which the said bladders are located forms a central passage defined by the tubes 12 and 13 also secured to the sleeve 9. A rod 14 adapted to slide inside said tubes 12 and 13 carries two annular oppositely directed pistons 15 and 16 acting respectively on the bottom portions of the bags 1a and 1b. Said pistons 15 and 16 are designed in the same manner as the piston 5 of Fig. 1 and 2, so as to show inside the casings 10 and 11 and with reference to the tubes 12 and 13 a certain play whereby the deformed portions of the bladders may engage freely the clearance thus formed between the pistons and said casings and tubes.

A spring 17 bearing against the bottom of the casing 10 acts on the piston 15; said spring may obviously be done away with and replaced by the pressure of a mass of compressed air acting on said piston. The folds formed by the bladders are capped by a corresponding rigid washer 6 carrying an annular diaphragm 18 similar to the diaphragm 7 of Figs. 1 and 2. The two bladders 1a and 1b communicate with each other on one hand through a channel 19 formed in the sleeve 9 and provided with an adjusting needle valve 20 and, on the other hand, through a channel 21 also formed in the sleeve 9 and controlled by a ball 22 forming a valve adapted to open the passage from 1b to 1a.

For a certain displacement of the rod 14 carrying the pistons, the reduction in volume shown by one of the bags corresponds to an equal increase in volume of the other bag. In the direction of opening of the door, the rod 14 enters the cylinders 10 and 11 against the action of the spring 17 while liquid passes through the channel 21 after removing the ball 22 off its seat. The automatic closing of the door is ensured through the expansion of the spring 17 that urges the rod 14 forwards. The movement of the latter is braked through the fact that the liquid can no longer find a return passage otherwise than through the throttled channel 19.

According to Fig. 4, wherein an embodiment of the invention is shown in the form of a door closing device, said device consists in a tubular casing 23 rotatably secured by means of a pin 24 to a support 25 attached to a door (not shown). Inside the casing are disposed two pistons 26 and 27 secured to said casing and a central circular ring 28 dividing the casing into two chambers each housing a damping arrangement, said damping arrangements acting for opposite directions. On each side of the ring and secured thereto by crimping inside notches 31 are mounted two tubes 32 forming rigid chambers inside each of which is disposed a flexible bladder 30 connected by reinforcing heels to the central ring 28.

The left tube 32 is disposed inside a sleeve 33 having a circular centering shoulder 34 bearing against the casing 23. Opposite the inner ends of each of the pistons 26 and 27 and seated against the bottom of each bladder, diaphragms 35 are provided to protect the folds of the bladder which, according to the preceding explanation, are formed when the piston penetrates inside the bladder. A spacing rod 36 maintains the diaphragms 35 in properly spaced arrangement while a bore 29 inside the ring 28 places both bladders in mutual communication.

From the foregoing description, the general operation of the device should be readily understood: more specifically, the device of Fig. 4 consists essentially of a fixed casing inside which the two opposed damping mechanisms are relatively displaced axially. For this displacement, and to permit connection of an outside member, an extension bushing 21 is provided on the ring 28 projecting outside the casing through a longitudinal slot 20. For adjusting the flow of fluid transferred from one bladder to another, through the communicating bore 29, a needle valve 19 is provided to obstruct said bore more or less and actuated by the operating screw 18. Consequently, connection with the bushing 21, for operating the inside cylinder arrangement may be effectuated by means of a bracket 17 engaging the bushing 21 (see Fig. 4).

As shown in Fig. 7, the centre ring 28 and the pivots providing the rotational axis 41 are mounted on the brackets 17 and 25 integral with a plate 42 which is adapted to be secured to a door (not shown). A bell crank 45 is adapted to pivot around the axis 41 and, also, is pivotally connected at 24 to one end of the casing 23; the free extremity of said crank 45 is connected at 44 to an adjustable arm 46 the other end of which is connected to a wall bracket 43 which may be secured to the jamb of the door.

Whenever the door is opened, the plate 42 moves therewith and the device describes an arc of a circle around the axis 41 while the axis 24 is also arcuately displaced to move therewith the casing 23 and, of course, the two pistons 26 and 27. The casing is displaced with respect to the centre ring 28 whereby this movement moves the rigid chamber and bladder with respect to the piston. Having a certain displacement, the decrease in volume of one bladder corresponds to an equal increase of volume of the other bladder. During its movement, the centre ring 28 compresses the spring 47 whereby the fluid expelled from one bladder passes through the bore 29, the return movement being effectuated by the motion of the spring, said return movement being further braked by the second damping device.

As shown in the drawings, the rigid chamber and bladder as well as the center ring are supported inside a sleeve sliding within the tubular casing, this arrangement enabling easy servicing in the field and replacement of the defective units by a new one. The arrangement of the casing inside enables also the liquid to be caught inside the casing in the event of a bladder rupture; for an apparatus of this type this is an important advantage.

The showing of Fig. 5 discloses a diaphragm of a slightly modified character constituted by a rigid washer 37 the diameter of which is slightly less than that of the bladder. An elastic packing 40, of annular formation, is disposed against the washer and a cup 39 marginally apertured maintains the packing in place against the washer. The apertures of the cup are provided to permit the return of liquid leaks inside the bladder.

Another modification is shown in Fig. 6 wherein the rigid washer 37 is formed with a central conical shoulder whereby, in one direction of movement, the annular elastic packing 40 has a tendency to be squeezed against the surface, to increase its packing effect. In the opposed direction, the friction against the surface of the bladder and cone allow disengagement of the packing to permit the return of leaks in the bladder through the apertures of the cup.

It must be understood that various changes as to the shape, size and arrangement of parts can be resorted to without departing from the spirit of the invention or the scope of the subjoined claims.

What I claim is:

1. Variable volume chamber of the character described, comprising a tubular enclosure, a flexible bladder lining the inside of said enclosure and closed at one end, a plunger adapted to deform the closed end of the bladder by penetration therein, said plunger being of smaller diameter than the inside diameter of the bladder for allowing a bladder fold to be formed therebetween, and a flexible diaphragm inside the bladder opposite the plunger and held thereagainst to form a piston bearing on the inside surface of said bladder.

2. In a variable volume chamber, a tubular casing, an elastic bladder lining the inside of the casing and closed at one end, a plunger adapted to deform the closed end of the said bladder by axial penetration therein, said plunger being smaller than the casing to allow the formation of a bladder fold therebetween, and a flexible diaphragm inside the bladder opposite the plunger and held thereagainst for pressing the bladder against the casing ahead of the fold.

3. In a variable volume chamber, a cylindrical casing, a plunger co-axially movable in said casing and concentrically spaced therefrom, an elastic deformable bladder closed at one end and inserted with its closed end towards the plunger and in contact with the inside wall of the casing, whereby the plunger is adapted to deform the bladder by axial penetration therein, said plunger being of smaller diameter than the inside diameter of the bladder for allowing a bladder fold to be formed therebetween, and a flexible diaphragm at the closed end of the bladder slidable thereinside as the plunger deforms the bladder and held against the plunger to form a piston to keep said bladder pressed against the wall of the casing.

4. A door-closing mechanism, comprising a tubular casing, a ring slidable inside said casing, means outside said casing for imparting a longitudinal movement to the ring through the casing, an open-ended cylinder on each side of the ring in axial alignment with the opposite cylinder, a closed elastic bladder in each cylinder, means for affording communication between the bladders through the ring, a plunger at each end of the casing adapted to enter the corresponding cylinder and deform the bladder therein as the ring is moved relatively to the casing, means in each bladder immediately adjacent the plunger for pressing said bladder against the cylinder wall, and a spring inside the casing and adapted to urge the cylinder assemblies towards one end of the casing.

References Cited in the file of this patent

UNITED STATES PATENTS

| Number | Name | Date |
|---|---|---|
| 1,219,035 | Pettengill | Mar. 13, 1917 |